US008943344B2

(12) United States Patent
Giat

(10) Patent No.: US 8,943,344 B2
(45) Date of Patent: Jan. 27, 2015

(54) POWER SOURCING EQUIPMENT FOR POWER OVER ETHERNET WITH LOW ENERGY STANDBY MODE

(71) Applicant: Microsemi Corp.-Analog Mixed Signal Group, Ltd., Hod Hasharon (IL)

(72) Inventor: Yaniv Giat, Modiin (IL)

(73) Assignee: Microsemi Corp.—Analog Mixed Signal Group, Ltd., Hod Hasharon (IL)

( * ) Notice: Subject to any disclaimer, the term of this patent is extended or adjusted under 35 U.S.C. 154(b) by 295 days.

(21) Appl. No.: 13/652,504

(22) Filed: Oct. 16, 2012

(65) Prior Publication Data

US 2013/0111245 A1    May 2, 2013

Related U.S. Application Data

(60) Provisional application No. 61/552,031, filed on Oct. 27, 2011.

(51) Int. Cl.
*G06F 1/32* (2006.01)
*H04L 12/46* (2006.01)
*H04L 12/10* (2006.01)

(52) U.S. Cl.
CPC ............ *H04L 12/4625* (2013.01); *H04L 12/10* (2013.01)
USPC .......................................... 713/320; 713/300

(58) Field of Classification Search
None
See application file for complete search history.

(56) References Cited

U.S. PATENT DOCUMENTS

| 6,701,443 | B1 | 3/2004 | Bell |
| 7,849,343 | B2 | 12/2010 | Ferentz |
| 2004/0260794 | A1* | 12/2004 | Ferentz et al. ................ 709/220 |
| 2006/0112285 | A1 | 5/2006 | Stineman |
| 2007/0165548 | A1 | 7/2007 | Woo |
| 2007/0260905 | A1* | 11/2007 | Marsden et al. ............... 713/323 |
| 2009/0063066 | A1* | 3/2009 | Maggiolino .................... 702/64 |

FOREIGN PATENT DOCUMENTS

JP    2009253307 A    10/2009

OTHER PUBLICATIONS

International Search Report for parallel application PCT/IL2012/050408 issued Dec. 20, 2012 by European Patent Office.
Written Opinion of the International Searching Authority for parallel application PCT/IL2012/050408 issued Dec. 20, 2012 by European Patent Office.

* cited by examiner

*Primary Examiner* — Paul Yanchus, III
(74) *Attorney, Agent, or Firm* — Simon Kahn

(57) ABSTRACT

A power sourcing equipment (PSE) exhibiting a low power sleep mode, the PSE constituted of: a sleep control circuitry comprising a first timer; an effective resistance threshold detector responsive to the sleep control circuitry and arranged to detect whether the effective resistance across the output port of the PSE is less than a predetermined threshold; and a detection and powering circuitry responsive to the sleep control circuitry, wherein the sleep control circuitry is arranged to load the first timer with a first predetermined time period, and at the expiration of the first predetermined time period: activate the effective resistance threshold detector for a second predetermined time period; and in the event the effective resistance threshold detector detects that the effective resistance across the output port of the PSE is less than the predetermined threshold, enable the detection and powering circuitry.

11 Claims, 3 Drawing Sheets

POWER SOURCING EQUIPMENT FOR POWER OVER ETHERNET WITH LOW ENERGY STANDBY MODE

CROSS-REFERENCE TO RELATED APPLICATION

This application claims priority from U.S. Provisional Application Ser. No. 61/552,031 filed Oct. 27, 2011, the entire contents of which is incorporated herein by reference.

BACKGROUND OF THE INVENTION

The present invention relates to power over Ethernet, and in particular to a power sourcing equipment exhibiting a low energy standby mode.

BACKGROUND OF THE INVENTION

Power over Ethernet (PoE), in accordance with both IEEE 802.3af-2003 and IEEE 802.3at-2009, each published by the Institute of Electrical and Electronics Engineers, Inc., New York, the entire contents of which is incorporated herein by reference, defines delivery of power over a set of 2 twisted wire pairs without disturbing data communication. The aforementioned standards particularly provides for a power sourcing equipment (PSE) and a powered device (PD). The power sourcing equipment is configured to detect the PD by ascertaining a valid signature resistance, and supply power over the 2 twisted wire pairs only after a valid signature resistance is actually detected.

Detection, in accordance with either of the above standards requires the supply of at least 2 voltage levels between the range of 2.8 volts and 10 volts, with a signature resistance of the PD determined based on a calculation of the actual voltage levels, or current, detected. The use of 2 voltage levels allows for determination of the signature resistance irrespective of the existence of a diode bridge, typically supplied at the input to the PD.

U.S. Pat. No. 7,849,343 issued Dec. 7, 2010 to Ferentz et al, the entire contents of which is incorporated herein by reference, is addressed to a method and apparatus for preventing harmful transients resulting from a probing routine for a valid PD 180 detection signature in a network. The method comprises providing a pre-detection output voltage via an impedance; obtaining an indication of the pre-detection output voltage; comparing the indication of the pre-detection output voltage with a pre-determined value; and in the event that the indication of the pre-detection output voltage is less than the pre-determined value; initiating a probing routine for a valid powered device detection signature.

European Commission Regulation (EC) No 278/2009 directs that ecodesign requirements for no-load condition electric power consumption of external power supplies shall not exceed 0.50 Watts one year after the regulation has come into force. Additionally, the regulation directs that two years after the regulation has come into force the no-load condition electric power consumption is not to exceed 0.30 Watts for power supplies delivering less than 51 Watts when active.

What is desired is a PSE architecture capable of meeting such inactive state energy draw requirements.

SUMMARY OF THE INVENTION

Accordingly, it is a principal object of the present embodiments to overcome at least some of the disadvantages of the prior art. This is provided in certain embodiments by providing a PSE with a sleep control circuitry and an effective resistance threshold detector responsive to the sleep control circuitry and arranged to determine if a load exhibiting an effective resistance less than a predetermined threshold value is connected to the output port. In the event that such a load is detected, power is supplied to a detection and powering functionality to detect, optionally classify, and power a connected powered device. Preferably, the effective resistance threshold detector comprises comparison circuitry, but is not arranged to identify if the load resistance is within the required range according to either of the above mentioned standard. The sleep control circuitry has a timer functionality arranged to periodically run the effective resistance threshold detector.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
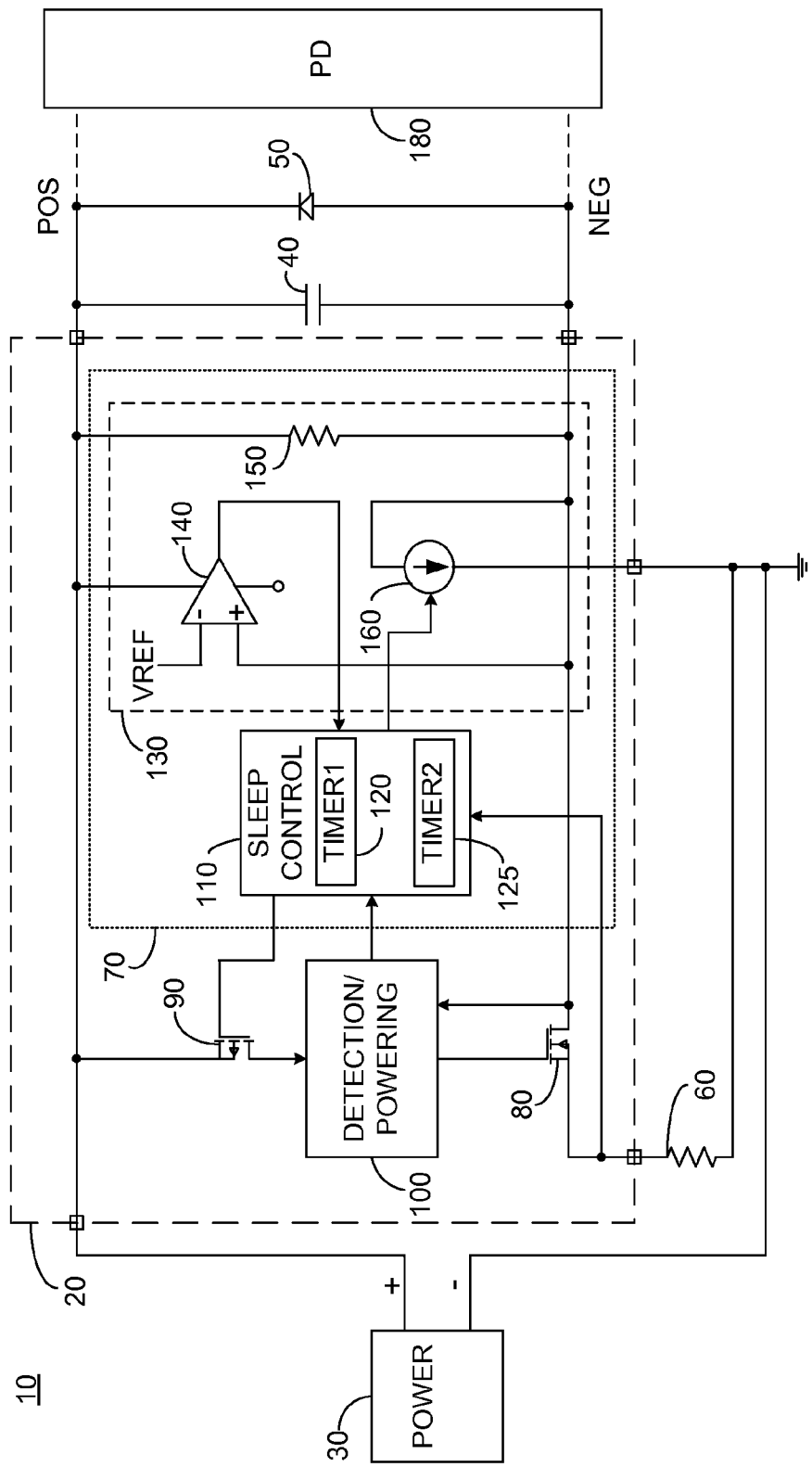
FIG. 1 illustrates a high level schematic diagram of a pre-detection functionality for a PSE comprising a resistor and a current source.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 illustrates a high level schematic diagram of a PSE arrangement 10 comprising: a PSE 20; a power source 30; a capacitor 40; a unidirectional electronic valve 50, illustrated without limitation as a diode; and a sense resistor 60. PSE 20 comprises: a pre-detection functionality 70; an electronically controlled switch 80, illustrated without limitation as an NMOSFET (NFET); an electronically controlled switch 90, illustrated without limitation as a PMOSFET (PFET); and a detection functionality 100. Pre-detection functionality 70 comprises: a sleep control circuitry 110, comprising a first timer 120 and a second timer 125; and an effective resistance threshold detector 130. Effective resistance threshold detector 130 comprises: a comparator 140; a resistor 150; and a current source 160. In one embodiment, current source 160 is arranged to drive a current of about 100 uA. In one embodiment, resistor 150 exhibits a resistance of about 80 kΩ. Diode 50 is arranged to ensure a non-valid PD 180 detection signature in the event of a reversed voltage PSE to PSE connection. A valid PD 180 may be coupled across nodes POS and NEG, as will be described further below.

A positive lead of power source 30 is coupled to the drain of PFET 90, to a first end of resistor 150, to a first end of capacitor 40 and to the cathode of diode 50, and defines a node POS. The source of PFET 90 is coupled to an input of detection and powering functionality 100 and the gate of PFET 90 is coupled to a respective output of sleep control circuitry 110. A second end of resistor 150, a second end of capacitor 40, the anode of diode 50 and a first end of current source 160 are each coupled to the drain of NFET 80 and to the non-inverting input of comparator 140, the connection defining a node NEG. Node NEG is further coupled to a respective input of detection and powering functionality 100. A second end of current source 160 is connected to a common potential, and current source 160 is arranged to drive current from the first end to the second end. A control input of current source 160 is coupled to a respective output of sleep control circuitry 110. The source of NFET 80 is coupled via sense resistor 60 to the common potential and the return terminal of power source 30 is coupled to the common potential. The gate of NFET 80 is coupled to a first output of detection and powering functionality 100 and a second output of detection and powering functionality 100 is coupled to a respective input of sleep control circuitry 110. The inverting input of comparator 140 is coupled to a reference voltage, denoted VREF. The output of comparator 140 is coupled to an input of sleep control circuitry 110. In one embodiment, the positive supply rail of comparator 140 is coupled to the positive lead of power source 30 and negative supply rail of comparator 140 is coupled to the common potential (not shown). The various other circuitry of PSE 20 is well know to those skilled in the art and in the interest of clarity is not further detailed.

In operation, sleep control timer functionality 110 is enabled responsive to an output of detection and powering functionality 100 indicative that no valid PD 180 has been detected and is being powered. NFET 80 and PFET 90 are set to open, thus powering down detection and powering functionality 100, since NFET 90 in an open state prevents the supply of power to detection and powering functionality 100, thereby reducing the power draw of PSE 20 to a minimal state. Sleep control timer functionality 110 is further arranged to load timer 120 with a first predetermined time period, which in one non-limiting embodiment is about 1.6 seconds. After expiration of the first time period, sleep control circuitry 110 activates current source 160 for a second predetermined time period, preferably by loading the second predetermined time period into timer 125. There is no requirement that timer 120 be different than timer 125, and in one embodiment a single timer is utilized.

Current source 160, when activated responsive to sleep control circuitry 160, forms a current which flows through resistor 150, thus performing pre-detection in cooperation with comparator 140 as will be described further below. In the event that no load of any type is coupled across nodes POS and NEG, the current from current source 160 flows through the parallel impedance of resistor 150 and capacitor 40. The resistance of resistor 150 is selected such that the voltage at node NEG in such a situation is less than VREF and as a result the output of comparator 140 remains negative. Sleep control circuitry 110 maintains PFET 90 in an open state responsive to the negative output of comparator 140. Responsive to expiration of the second predetermined time period loaded into timer 125, sleep control circuitry 110 deactivates current source 160 and the first predetermined time period is again loaded into timer 120. In one non-limiting embodiment, the second predetermined time period is a period substantially no greater than the time needed to perform the above detection, such as 40 milliseconds.

In the event that a load is coupled across nodes POS and NEG, such as in the event that valid PD 180 is coupled across nodes POS and NEG, when current source 160 is activated the current from current source 160 flows through the parallel impedance of resistor 150, capacitor 40 and the effective resistance of the load coupled across nodes POS and NEG. The term effective resistance is meant to include any capacitance and inductance between nodes POS and NEG. In the event that the effective resistance coupled across nodes POS and NEG is greater than a threshold value, the voltage at node NEG will be less than VREF and the output of comparator 140 will continue to be negative. Sleep control circuitry 110 thus maintains PFET 90 in an open state responsive to the negative output of comparator 140. The threshold value is representative of a valid signature resistance value, i.e. a signature resistance of a valid PD 180 complying with IEEE 802.3af-2003 or IEEE 802.3at-2009, taking into account the potential for a full diode bridge. In one embodiment, the threshold value is about 30 KΩ. As described above, after the second predetermined time period current source 160 is deactivated and the first predetermined time period is again loaded into timer 120.

In the event that the effective resistance coupled across nodes POS and NEG is less than or equal to the threshold value, such as in the event that valid PD 180 is coupled across nodes POS and NEG, when current source 160 is activated the voltage at node NEG will be greater than VREF and as a result the output of comparator 140 will be positive. Sleep control circuitry 110 is arranged to close PFET 90 responsive to the positive output of comparator 140 and power is supplied to detection and powering functionality 100. Detection and powering functionality 100 deactivates sleep control circuitry 100 and performs detection to determine if valid PD 180 is coupled across nodes POS and NEG. In the event that detection and powering functionality 100 detects that valid PD 180 is coupled across nodes POS and NEG, NFET 80 is closed and power is supplied to valid PD 180 in accordance with the above mentioned standards, or in accordance with propriety standards, without limitation. In one embodiment, as shown, detection is performed by driving current through NFET 80 in a controlled manner to generate the required detection voltages, however this is not meant to be limiting in any way, and detection via a dedicated current source may be performed without exceeding the scope.

In the event that detection and powering functionality 100 detects that valid PD 180 is not coupled across nodes POS and NEG, i.e. a load which is not a valid PD 180, detection and powering functionality 100 does not provide power to the attached load, and in particular maintains NFET 80 in an open state, and again initiates the sleep mode of sleep control circuitry 110, as described above. The operation of detection and powering functionality 100, NFET 80 and sense resistor 60 to detect, optionally classify, and power a valid PD 180 is well known to those skilled in the art and will not be further described for the sake of brevity.

A PSE 20, including a coupled valid PD 180 typically consumes less than 50 Watts, and thus preferably the first and second predetermined time periods of timer 120 are determined such that the average power consumption of PSE 20 while PSE 20 is in the sleep mode, plus the amount of power drawn for detection by detection and powering functionality 100, when valid PD 180 is not coupled across nodes POS and NEG, averaged over the cycle time of timer 120, is not greater than 0.5 Watts, and preferably not greater than 0.3 Watts.

Figure 2:
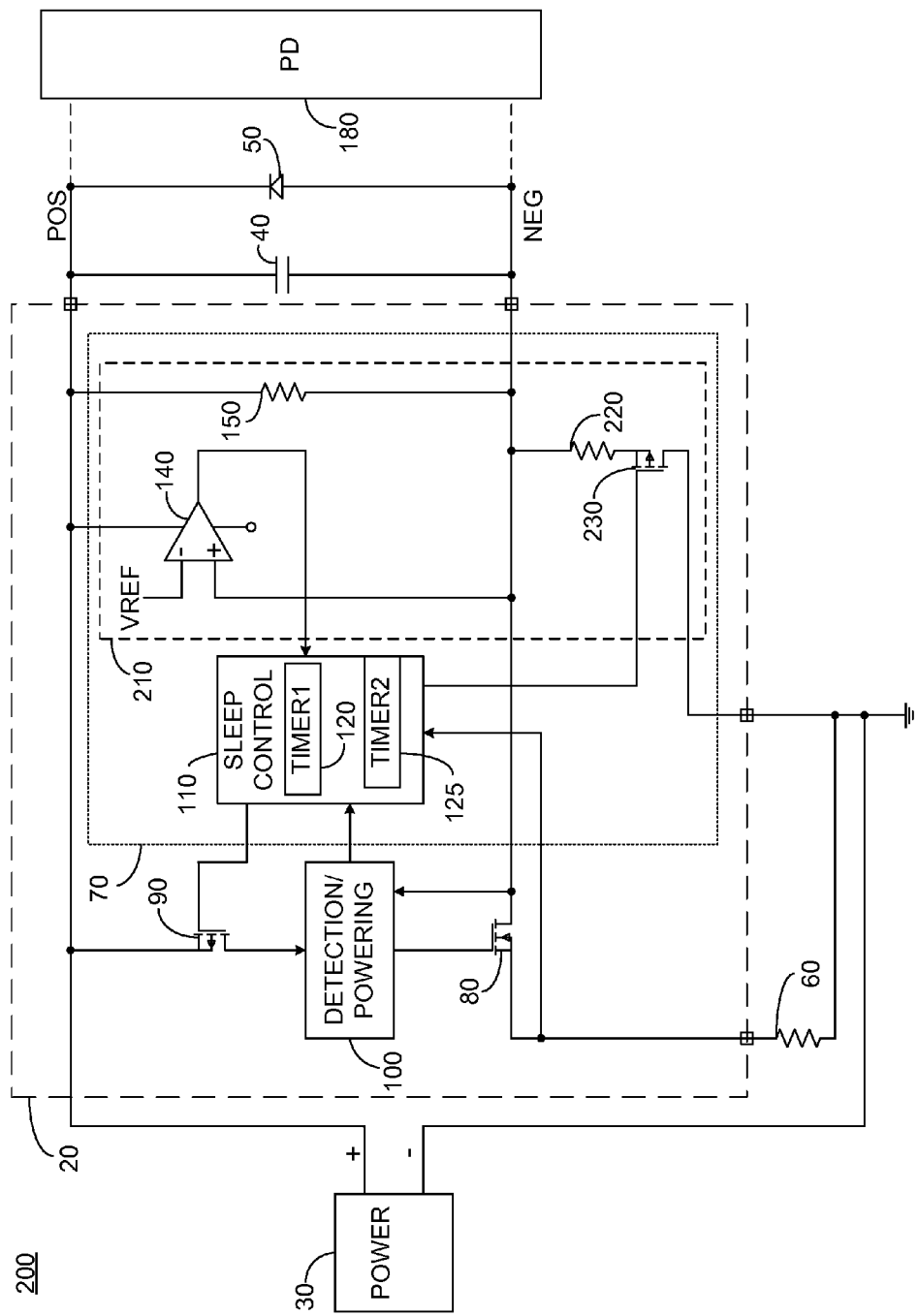
FIG. 2 illustrates a high level schematic diagram of a pre-detection functionality for a PSE comprising a voltage divider.

FIG. 2 illustrates a high level schematic diagram of a PSE arrangement 200, which is in all respects similar to PSE arrangement 10 of FIG. 1, with the exception that effective resistance threshold detector 130 is replaced with effective resistance threshold detector 210. Effective resistance threshold detector 210 comprises: a comparator 140; a resistor 150; a resistor 220; and an electronically controlled switch 230, illustrated without limitation as a PFET. In one embodiment, the resistance of resistor 220 is about 20 times the resistance of resistor 150. The non-inverting input of comparator 140 is coupled to node NEG, the inverting input of comparator 140 is coupled to a reference voltage denoted VREF and the output of comparator 140 is coupled to a respective input of sleep control circuitry 110. In one embodiment, the positive supply rail of comparator 140 is coupled to the positive lead of power source 30 and the negative supply rail is coupled to the common potential (not shown). A first end of resistor 150 is coupled to node POS and a second end of resistor 150 is coupled to a first end of resistor 220 at node NEG. A second end of resistor 220 is coupled to the source of PFET 230, the drain of PFET 230 is coupled to the common potential and the gate of PFET 230 is coupled to an output of sleep control circuitry 110. Thus, the output of sleep control circuitry 110 which in PSE arrangement 10 is coupled to the control input of current source 160 is in PSE arrangement 200 coupled to the gate of PFET 230.

In operation, sleep control timer functionality 110 is enabled responsive to an output of detection and powering functionality 100 indicative that no valid PD 180 has been detected and is being powered. NFET 80, PFET 90 and NFET 230 are set to open, thus powering down detection and powering functionality 100. Sleep control timer functionality 110 is further arranged to load timer 120 with a first predetermined time period, which in one non-limiting embodiment is about 1.6 seconds. After expiration of the first time period, sleep control circuitry 110 closes PFET 230 for a second predetermined time period, preferably by loading the second predetermined time period into timer 125. There is no requirement that timer 120 be different than timer 125, and in one embodiment a single timer is utilized. In the event that no load of any type is coupled between nodes POS and NEG, the voltage from power source 30 is divided between: the parallel impedance of resistor 150 and capacitor 40; and the resistance of resistor 220. The resistances of resistors 150 and 220 are selected such that in the event that no load is coupled across nodes POS and NEG the voltage at node NEG is less than VREF and as a result the output of comparator 140 is negative. Sleep control circuitry 110 maintains PFET 90 in an open state responsive to the negative output of comparator 140. Responsive to expiration of the second predetermined time period loaded into timer 125, sleep control circuitry 110 opens PFET 230 and the first predetermined time period is again loaded into timer 120. In one non-limiting embodiment, the second predetermined time period is a period substantially no greater than the time needed to perform the above detection, such as 40 milliseconds.

In the event that a load is coupled across nodes POS and NEG, such as in the event that valid PD 180 is coupled across nodes POS and NEG, when PFET 230 is closed the voltage from power source 30 is divided between: the parallel impedance of resistor 150, capacitor 40 and the effective resistance of the load coupled between nodes POS and NEG; and resistor 220. The term effective resistance is meant to include any capacitance and inductance between nodes POS and NEG. In the event that the effective resistance of the load coupled across nodes POS and NEG is greater than a threshold value, the voltage at node NEG will be less than VREF and the output of comparator 140 remains negative. Sleep control circuitry 110 thus maintains PFET 90 in an open state responsive to the negative output of comparator 140. The threshold value is representative of a valid signature resistance value, i.e. a signature resistance of a valid PD 180 complying with IEEE 802.3af-2003 or IEEE 802.3at-2009. In one embodiment, the threshold value is about 30 KΩ. As described above, after the second predetermined time period PFET 230 is opened and the first predetermined time period is again loaded into timer 120.

In the event that the effective signature resistance of the load coupled across nodes POS and NEG is less than or equal to the threshold value, such as in the event that valid PD 180 is coupled between nodes POS and NEG, when PFET 230 is closed the voltage at node NEG will be greater than VREF and the output of comparator 140 will be positive. Sleep control circuitry 110 is arranged to close PFET 90 responsive to the positive output of comparator 140 and power is supplied to detection and powering functionality 100. Detection and powering functionality 100 deactivates sleep control circuitry 100 and performs detection to determine if valid PD 180 is coupled across nodes POS and NEG. In the event that detection and powering functionality 100 detects that valid PD 180 is coupled across nodes POS and NEG, NFET 80 is closed and power is supplied to valid PD 180 in accordance with the above mentioned standards, or in accordance with propriety standards, without limitation. In one embodiment, as shown, detection is performed by driving current through NFET 80 in a controlled manner to generate the required detection voltages, however this is not meant to be limiting in any way, and detection via a dedicated current source may be performed without exceeding the scope. In the event that detection and powering functionality 100 detects that valid PD 180 is not coupled across nodes POS and NEG, i.e. a load which is not valid PD 180, detection and powering functionality 100 does not provide power to the attached load, and in particular maintains NFET 80 in an open state, and again initiates the sleep control circuitry 110, as described above. The operation of detection and powering functionality 100, NFET 80 and sense resistor 60 to detect, optionally classify, and power valid PD 180 is well known to those skilled in the art and will not be further described for the sake of brevity.

As described above, PSE 20, including a coupled valid PD 180 typically consumes less than 50 Watts, and thus preferably the first and second predetermined time periods of timer 120 are determined such that the average power consumption of pre-detection functionality 70 while PSE 20 is in the sleep mode, plus the amount of power drawn for detection by detection and powering functionality 100, when valid PD 180 is not coupled across nodes POS and NEG, averaged over the cycle time of timer 120, is not greater than 0.5 Watts, and preferably not greater than 0.3 Watt.

Figure 3:
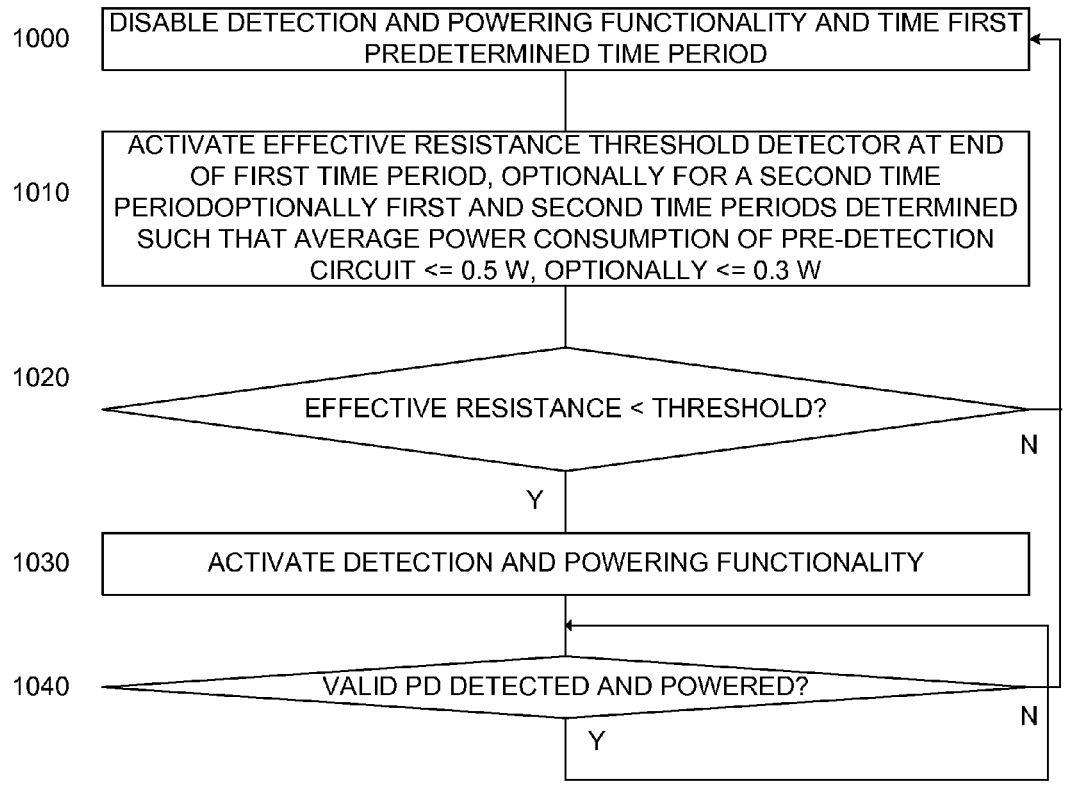
FIG. 3 illustrates a high level flow chart of a method of pre-detection for a PSE.

FIG. 3 illustrates a high level flow chart of a method of providing a low power sleep mode for a PSE. In stage 1000, when the detection and powering functionality is in a non-active mode, i.e. no valid PD is detected or powered, the detection and powering functionality is disabled and a first predetermined time period is measured. In one embodiment, the first predetermined time period is about 1.6 seconds. In stage 1010, subsequent to the first predetermined time period of stage 1000, the effective resistance across the output of PSE is compared with a predetermined threshold, optionally for a second predetermined time period. Optionally, the first and second predetermined time periods are selected such that the average power consumption of the PSE in the sleep mode, plus the amount of power drawn for detection when a valid PD is not coupled across the output port of the PSE, is not greater than 0.5 Watts, and preferably not greater than 0.3 Watts In stage 1020, the output of the effective resistance threshold detection of stage 1010 is monitored. In the event that the effective resistance is less than the predetermined threshold, in stage 1030 the detection and powering functionality disabled in stage 1000 is activated. In stage 1040 in the event that a valid PD is detected and powered, stage 1040 is maintained thereby powering the valid PD by the PSE. In the event that in stage 1040 a valid PD is not detected or powered, stage 1000 as described above is performed. In stage 1020, in the event that the effective resistance is not less than the predetermined threshold, stage 1000 as described above is performed.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

The invention claimed is:

1. A power sourcing equipment (PSE) exhibiting a low power sleep mode comprising:
a sleep control circuitry comprising a first timer;
an effective resistance threshold detector responsive to said sleep control circuitry and arranged to detect whether an effective resistance across an output port of the PSE is less than a predetermined threshold; and
a detection and powering circuitry responsive to said sleep control circuitry,
wherein said sleep control circuitry is arranged to load said first timer with a first predetermined time period, and at the expiration of said first predetermined time period:
activate said effective resistance threshold detector;
in the event said activated effective resistance threshold detector detects that the effective resistance across the output port of the PSE is less than the predetermined threshold, enable said detection and powering circuitry; and
in the event said activated effective resistance threshold detector does not detect that the effective resistance across the output port of the PSE is less than the predetermined threshold, deactivate said effective resistance threshold detector and load said first timer with the first predetermined time period,
wherein said effective resistance threshold detector comprises:
a first resistance coupled across the output port of the PSE, a first end of said first resistance arranged to be coupled to a power source;
an electronically controlled switch;
a second resistance, said second resistance selectively coupled by said electronically controlled switch to be in series with said first resistance and to present a path in cooperation with said first resistance between a first lead of the PSE output port and a return of the power source: and
a comparator arranged to compare the voltage across said second resistance with a reference voltage,
wherein said activation of said effective resistance threshold detector comprises activation of said electronically controlled switch to present the path in cooperation with said first resistance and said deactivation of said effective resistance threshold detector comprises deactivation of said electronically controlled switch so as not to present the path in cooperation with said first resistance.

2. The power sourcing equipment of claim 1, wherein said sleep control circuitry further comprises a second timer, said sleep control circuitry arranged to load said second timer with a second predetermined time period and deactivate said effective resistance threshold detector responsive to expiration of said second time period.

3. The power sourcing equipment of claim 2, wherein said first and second predetermined time periods are determined such that the average power consumption of the PSE in the absence of a valid powered device coupled the output port of the PSE is no greater than 0.5 Watts.

4. The power sourcing equipment of claim 2, wherein said first and second predetermined time periods are determined such that the average power consumption of the PSE in the absence of a valid powered device coupled the output port of the PSE is no greater than 0.3 Watts.

5. A method of providing a low power sleep mode for a power sourcing equipment (PSE) the method comprising:
providing an effective resistance threshold detector arranged to detect whether an effective resistance across an output port of the PSE is less than a predetermined threshold;
providing a detection and powering circuitry;
activating, at the expiration of a first predetermined time period, said provided effective resistance threshold detector;
in the event said provided effective resistance threshold detector detects that the effective resistance across the output port of the PSE is less than a predetermined threshold, enabling said provided detection and powering circuitry; and
in the event said provided effective resistance threshold detector does not that the effective resistance across the output port of the PSE is less than the predetermined threshold, deactivating said provided effective resistance threshold detector for the first predetermined time period, wherein said provided effective resistance threshold detector comprises:
a first resistance coupled across the output port of the PSE, a first end of said first resistance arranged to be coupled to a power source;
an electronically controlled switch;
a second resistance, said second resistance selectively coupled by said electronically controlled switch to be in series with said first resistance and to present a path in cooperation with said first resistance between a first lead of the PSE output port and a return of the power source; and
a comparator arranged to compare the voltage across said second resistance with a reference voltage,
wherein said activating of said effective resistance threshold detector comprises activating said electronically controlled switch to present the path in cooperation with said first resistance and said deactivating said effective resistance threshold detector comprises deactivating said electronically controlled switch so as not to present the path in cooperation with said first resistance.

6. The method of claim 5, wherein said activating of said provided effective resistance threshold detector is for a second predetermined time period, and wherein said first and said second predetermined time periods are selected such that the average power consumption of the PSE in the absence of a valid powered device coupled the output port of the PSE is no greater than 0.5 Watts.

7. The method of claim 5, wherein said activating of said provided effective resistance threshold detector is for a second predetermined time period, and wherein said first and said second predetermined time periods are selected such that the average power consumption of the PSE in the absence of a valid powered device coupled the output port of the PSE is no greater than 0.3 Watts.

8. A power sourcing equipment (PSE) exhibiting a low power sleep mode comprising:
a sleep control circuitry comprising a first timer;
a means for detecting whether an effective resistance across an output port of the PSE is less than a predetermined threshold; and
a detection and powering circuitry responsive to said sleep control circuitry,
wherein said sleep control circuitry is arranged to load said first timer with a first predetermined time period, and at the expiration of said first predetermined time period:
activate said means for detecting;
in the event said activated means for detecting detects that the effective resistance across the output port of the PSE is less than the predetermined threshold, enable said detection and powering circuitry; and
in the event said activated means for detecting does not detect that the effective resistance across the output port of the PSE is less than the predetermined threshold, deactivate said means for detecting and load said first timer with the first predetermined time period,
wherein said means for detecting comprises:
a first resistance coupled across the output of the PSE, a first end of said first resistance arranged to be coupled to a power source;
an electronically controlled switch;
a second resistance, said second resistance selectively coupled by said electronically controlled switch to be in series with said first resistance and to present a path in cooperation with said first resistance between a first lead of the output port of the PSE and a return of the power source; and
a comparator arranged to compare the voltage across said second resistance with a reference voltage,
wherein said activation of said means for detecting comprises activation of said electronically controlled switch to present the path in cooperation with said first resistance and said deactivation of said means for detecting comprises deactivation of said electronically controlled switch so as not to present the path in cooperation with said first resistance.

9. The power sourcing equipment of claim 8, wherein said sleep control circuitry further comprises a second timer, said sleep control circuitry arranged to load said second timer with a second predetermined time period and deactivate said means for detecting responsive to expiration of said second time period.

10. The power sourcing equipment of claim 9, wherein said first and second predetermined time periods are determined such that the average power consumption of the PSE in the absence of a valid powered device coupled the output port of the PSE is no greater than 0.5 Watts.

11. The power sourcing equipment of claim 9, wherein said first and second predetermined time periods are determined such that the average power consumption of the PSE in the absence of a valid powered device coupled the output port of the PSE is no greater than 0.3 Watts.

* * * * *